(12) United States Patent
Lohrentz et al.

(10) Patent No.: US 8,413,413 B2
(45) Date of Patent: Apr. 9, 2013

(54) PIVOTING GATHERING AUGER FOR CORN HEADER

(75) Inventors: Randy Lohrentz, Buhler, KS (US); Robert A. Matousek, Milan, IL (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/213,119

(22) Filed: Aug. 19, 2011

(65) Prior Publication Data

US 2012/0042620 A1    Feb. 23, 2012

Related U.S. Application Data

(60) Provisional application No. 61/375,196, filed on Aug. 19, 2010, provisional application No. 61/425,804, filed on Dec. 22, 2010, provisional application No. 61/425,836, filed on Dec. 22, 2010, provisional application No. 61/425,887, filed on Dec. 22, 2010, provisional application No. 61/425,907, filed on Dec. 22, 2010, provisional application No. 61/425,920, filed on Dec. 22, 2010, provisional application No. 61/425,935, filed on Dec. 22, 2010, provisional application No. 61/426,072, filed on Dec. 22, 2010, provisional application No. 61/426,119, filed on Dec. 22, 2010, provisional application No. 61/426,141, filed on Dec. 22, 2010, provisional application No. 61/426,167, filed on Dec. 22, 2010, provisional application No. 61/426,193, filed on Dec. 22, 2010, provisional application No. 61/426,213, filed on Dec. 22, 2010, provisional application No. 61/426,234, filed on Dec. 22, 2010, provisional application No. 61/426,263, filed on Dec. 22, 2010, provisional application No. 61/426,277, filed on Dec. 22, 2010, provisional application No. 61/426,300, filed on Dec. 22, 2010, provisional application No. 61/426,090, filed on Dec. 22, 2010.

(51) Int. Cl.
*A01D 45/02* (2006.01)

(52) U.S. Cl.
USPC ............................................................ 56/95

(58) Field of Classification Search ............... 56/85, 95, 56/119
See application file for complete search history.

(56) References Cited

U.S. PATENT DOCUMENTS

| 110,061 A | 12/1870 | Meader et al. |
| 1,160,777 A | 11/1915 | B-Yson |

(Continued)

FOREIGN PATENT DOCUMENTS

| AT | 379932 B | 3/1986 |
| DE | 2011976 A1 | 9/1971 |

(Continued)

OTHER PUBLICATIONS

International Search Report for International Applicaiton No. PCT/US2011/048346 Dated Dec. 23, 2011.

(Continued)

*Primary Examiner* — Thomas B Will
*Assistant Examiner* — Mai Nguyen

(57) ABSTRACT

A pivoting gathering auger for a row unit of a harvesting header. The gathering auger cooperates with a striper plate to remove useable parts from crop stalks gathered in a crop passage and to convey the stripped useable parts rearward into the cross auger of the header. The gathering auger pivots in a vertical plane between a first position for harvesting and a second position for maintenance. While in the maintenance position, a distal end of the gathering auger does not communicate with the cross auger. The useable parts are conveyed rearward free of obstruction to the cross auger.

12 Claims, 11 Drawing Sheets

U.S. PATENT DOCUMENTS

| | | | |
|---|---|---|---|
| 1,855,109 A | | 4/1932 | Justman |
| 2,152,273 A | * | 3/1939 | August .......................... 56/15.1 |
| 2,182,772 A | | 12/1939 | Nightenhelser et al. |
| 2,288,915 A | | 7/1942 | Morral et al. |
| 2,341,248 A | | 2/1944 | Urschel |
| 2,399,774 A | * | 5/1946 | Welty ................................ 56/95 |
| 2,406,058 A | | 8/1946 | Boone, Sr. |
| 2,440,791 A | * | 5/1948 | Welty ........................ 56/16.4 R |
| 2,554,198 A | | 5/1951 | Kuhlman |
| 2,571,865 A | | 10/1951 | Greedy et al. |
| 2,604,750 A | | 7/1952 | Fergason |
| 2,656,666 A | | 10/1953 | Collins |
| 2,665,538 A | | 1/1954 | Andrews |
| 2,710,062 A | | 6/1955 | Lanstrom |
| 2,716,321 A | * | 8/1955 | Schaaf et al. .................... 56/104 |
| 2,821,058 A | | 1/1958 | Jones |
| 2,881,579 A | | 4/1959 | Aasland |
| 2,946,170 A | * | 7/1960 | Anderson ................. 56/16.4 R |
| 3,069,832 A | | 12/1962 | Baker |
| 3,119,221 A | * | 1/1964 | Martin ............................ 56/119 |
| 3,304,703 A | | 2/1967 | Schaaf |
| 3,434,271 A | * | 3/1969 | Fogels et al. ...................... 56/60 |
| 3,508,387 A | * | 4/1970 | Wright ............................... 56/95 |
| 3,517,490 A | | 6/1970 | Mathews |
| 3,596,448 A | * | 8/1971 | Van Buskirk ..................... 56/63 |
| 3,600,876 A | | 8/1971 | Tanzer |
| 3,771,300 A | * | 11/1973 | Jourdan .......................... 56/119 |
| 3,855,761 A | | 12/1974 | Louks |
| 4,321,786 A | * | 3/1982 | Burton ............................ 56/330 |
| 4,329,835 A | * | 5/1982 | Pucher ......................... 56/320.1 |
| 4,429,516 A | * | 2/1984 | Erickson .......................... 56/95 |
| 4,471,876 A | | 9/1984 | Stevenson et al. |
| 4,553,379 A | * | 11/1985 | Kalverkamp ..................... 56/60 |
| 5,009,061 A | * | 4/1991 | Heuling .......................... 56/104 |
| 5,557,912 A | * | 9/1996 | Voss et al. ....................... 56/130 |
| 5,787,696 A | | 8/1998 | Wiegert et al. |
| 5,865,019 A | * | 2/1999 | Hurlburt et al. ................ 56/119 |
| 5,913,803 A | * | 6/1999 | Moster .............................. 56/95 |
| 5,924,269 A | | 7/1999 | McMillen |
| 6,341,481 B1 | * | 1/2002 | van der Merwe ................ 56/95 |
| 6,412,259 B1 | * | 7/2002 | Wiegert ............................ 56/60 |
| 7,043,891 B2 | * | 5/2006 | Rickert et al. .................. 56/119 |
| 7,395,649 B2 | * | 7/2008 | Wubbels et al. .................. 56/52 |
| 7,493,745 B2 | | 2/2009 | Wübbles et al. |
| 7,752,829 B1 | * | 7/2010 | Rottinghaus .................... 56/110 |
| 8,074,434 B2 | | 12/2011 | Taylor et al. |

FOREIGN PATENT DOCUMENTS

| | | |
|---|---|---|
| DE | 8600113 U1 | 6/1986 |
| DE | 8629890 U1 | 1/1988 |
| DE | 4344669 C1 | 4/1995 |
| DE | 19714623 C1 | 6/1998 |
| DE | 19811156 A1 | 9/1999 |
| DE | 10350302 A1 | 8/2004 |
| DE | 10350302 B4 | 10/2005 |
| DE | 102004020447 A1 | 12/2005 |
| DE | 102004020447 B4 | 7/2006 |
| DE | 102005054998 A1 | 5/2007 |
| EP | 0369440 A1 | 5/1990 |
| FR | 1 509 506 | 1/1968 |
| FR | 1509508 A | 1/1968 |
| FR | 2941593 A1 | 8/2010 |
| WO | 0108465 A1 | 2/2001 |
| WO | 2008104816 A1 | 9/2008 |

OTHER PUBLICATIONS

International Search Report and Written Opinion, mailed May 21, 2012 for PCT/US2011/065783.
International Search Report and Written Opinion, mailed Jan. 2, 2012 for PCT/US2011/048184.
International Search Report and Written Opinion, mailed Jan. 2, 2012 for PCT/US2011/048350.
International Search Report and Written Opinion, mailed Jan. 2, 2012 for PCT/US2011/048379.
International Search Report and Written Opinion, mailed Jan. 2, 2012 for PCT/US2011/048337.
International Search Report and Written Opinion, mailed Jan. 2, 2012 for PCT/US2011/048388.
International Search Report and Written Opinion, mailed Jan. 2, 2012 for PCT/US2011/048354.

* cited by examiner

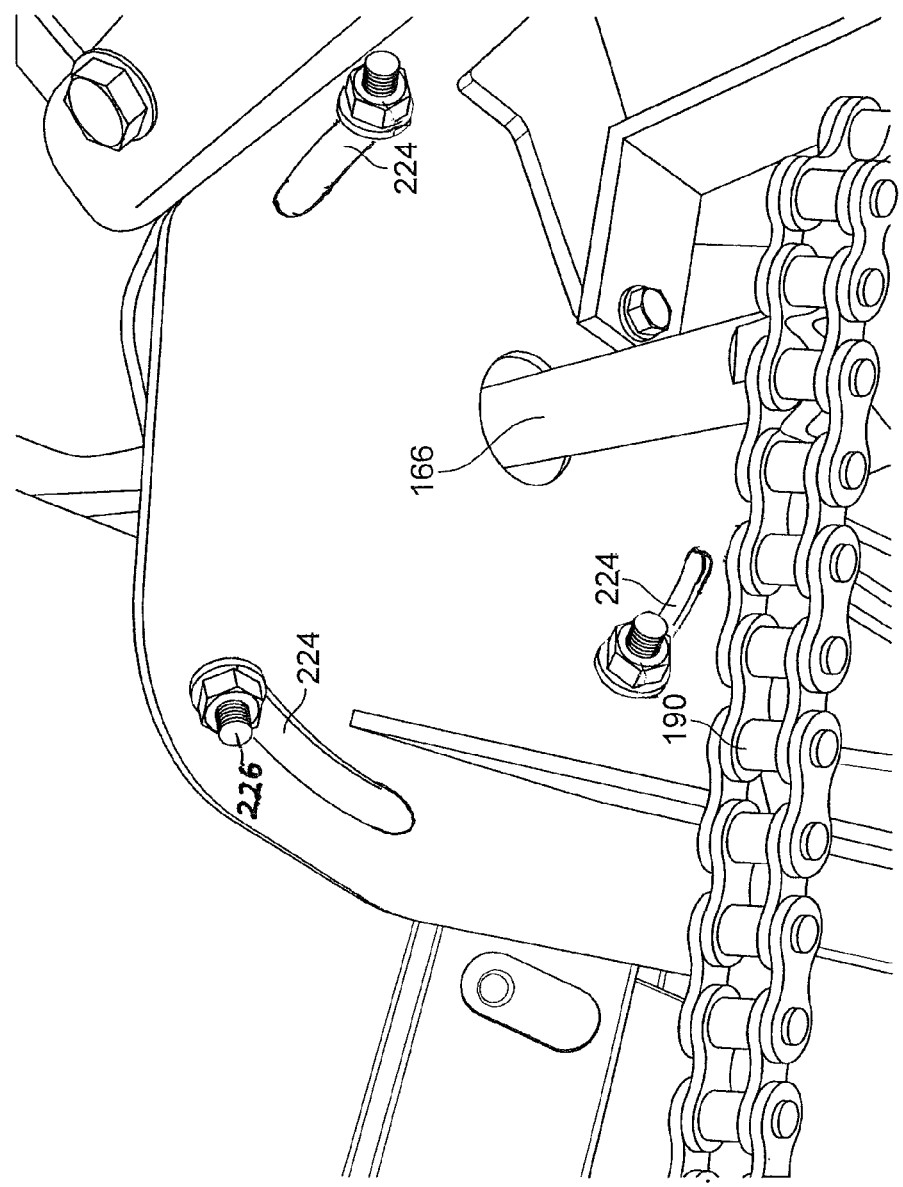

PIVOTING GATHERING AUGER FOR CORN HEADER

CROSS REFERENCE TO RELATED APPLICATIONS

The present application claims the benefit of U.S. provisional application entitled "CORN HEADER", having Ser. No. 61/375,196, filed Aug. 19, 2010; of U.S. provisional application entitled "TILTING CROP STALK CHOPPER", having Ser. No. 61/426,090, filed Dec. 22, 2010; of U.S. provisional application entitled "PIVOTING GATHERING AUGER FOR CORN HEADER ", having Ser. No. 61/425,836, filed Dec. 22, 2010; of U.S. provisional application entitled "CROP CAPTURING MEMBER FOR CORN HEADER WITH GATHERING AUGER", having Ser. No. 61/425,887, filed Dec. 22, 2010; of U.S. provisional application entitled "GATHERING AUGER WITH INDEPENDENT SPEED", having Ser. No. 61/425,907, filed Dec. 22, 2010; of U.S. provisional application entitled "COMBINATION DRIVEN AND IDLER SNAP ROLLS FOR CORN HEADER", having Ser. No. 61/425,920, filed Dec. 22, 2010; of U.S. provisional application entitled "SPRING LOADED SNAP ROLL FOR CORN HEADER", having Ser. No. 61/425,935, filed Dec. 22, 2010; of U.S. provisional application entitled "HELICAL ACTING SNAP ROLL FLUTES FOR CORN HEADER", having Ser. No. 61/426,072, filed Dec. 22, 2010; of U.S. provisional application entitled "REMOVABLE CORN HEADER SNOUT", having Ser. No. 61/426,119, filed Dec. 22, 2010; of U.S. provisional application entitled "OFFSET SNAP ROLLS FOR CORN HEADER", having Ser. No. 61/426,141, filed Dec. 22, 2010; of U.S. provisional application entitled "DUAL IDLER ROLLS FOR CORN HEADER", having Ser. No. 61/426,167, filed Dec. 22, 2010; of U.S. provisional application entitled "SNAP ROLLS WITH HELICAL FLUTES FOR CORN HEADER", having Ser. No. 61/426,193, filed Dec. 22, 2010; of U.S. provisional application entitled "SMOOTH IDLER ROLL FOR CORN HEADER", having Ser. No. 61/426,213, filed Dec. 22, 2010; of U.S. provisional application entitled "OFFSET STRIPPER PLATES FOR CORN HEADER", having Ser. No. 61/426,234, filed Dec. 22, 2010; of U.S. provisional application entitled "METHOD FOR URGING CROP STALKS INTO A GATHERING AUGER FOR A CORN HEADER", having Ser. No. 61/426,263, filed Dec. 22, 2010; of U.S. provisional application entitled "HELICAL ACTING STRAIGHT SNAP ROLL FLUTES FOR CORN HEADER", having Ser. No. 61/426,277, filed Dec. 22, 2010; of U.S. provisional application entitled "TWISTED STALK CHOPPING FLUTES FOR CORN HEADER", having Ser. No. 61/426,300, filed Dec. 22, 2010; of U.S. provisional application entitled "CANTILEVERED GATHERING AUGER FOR CORN HEADER", having Ser. No. 61/425,804, filed Dec. 22, 2010; which are all incorporated herein by reference in their entirety.

TECHNICAL FIELD

This invention relates to cutting and gathering stalk crops such as corn with a header coupled to an agricultural vehicle.

BACKGROUND

Agricultural harvesters such as combines are typically equipped with a harvesting header. Corn headers are specifically designed to pick corn and vary in size from two-row units to twelve-row units or more. As the harvester moves through the field, each row-unit passes between rows of corn. Corn header row units typically use gathering chains to convey crop material and ears rearward toward a cross auger. A set of driven snap rolls, which rotate based on the speed of the harvester, grabs the corn stalks and forces them downward between stripper plates. The ears of corn are snapped free of the stalk and the cross auger passes the ears to the feeder housing of the harvester. If the snap rolls are operated too fast or too slow, ears of corn may be lost or entire corn stalks may be passed to the cross auger and feeder housing.

Known row units require two gathering chains and two tensioners which are heavy, expensive and wear out easily. Furthermore, the gathering chains create a complicated drive mechanism because the axes of the drive sprockets driving the chains are at right angles to the axes of the snap rolls. Also, the gathering chains do not effectively convey a large mass of crop in conditions when material other than ears of corn, such as stalks and leaves, are severed from the ground. What is needed is a simpler and more cost effective row unit that is capable of conveying a large mass of crop.

BRIEF DESCRIPTION OF THE DRAWINGS

The accompanying drawings, which are incorporated in and constitute a part of this disclosure, illustrate various embodiments of the present invention. In the drawings:

FIG. 11 shows the fasteners moved all the way to the opposite end of the slots when the gathering auger is pivoted upward.

DESCRIPTION OF EXAMPLE EMBODIMENTS

Figure 1:
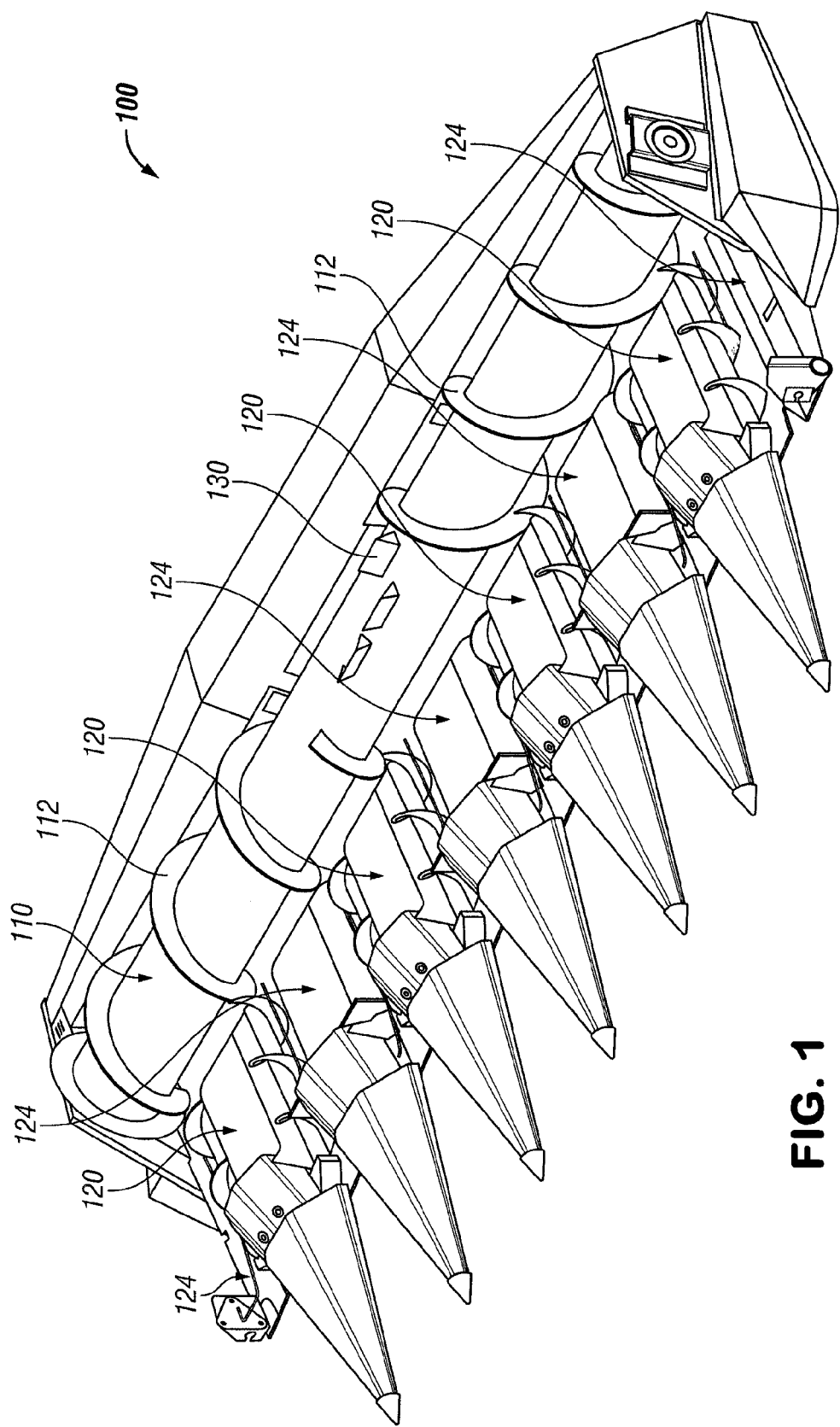
FIG. 1 shows a perspective view of a corn header having a plurality of row units for an agricultural vehicle.

The present invention is susceptible of embodiments in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "left" and "right", are made as viewed from the front looking rearward.

The exemplary header 100 selected for illustration in FIGS. 1-5 has a cross auger 110 with spiral flighting 112 for sweeping the ears of corn toward the center of the header 100. Large cross augers 110 may also have paddles 130, fingers 132 or some other means to facilitate the delivery of the crop rearward to the feeder housing of a harvester. The header 110 has a plurality of forward-extending live row-units 120 and a plurality of forward-extending dead row units 124. The row units 120, 124 and the cross auger 110 define a feeder plane therebetween where useable parts of stalk crops are conveyed rearward from the row units 120, 124 to the cross auger 110.

Figure 2:
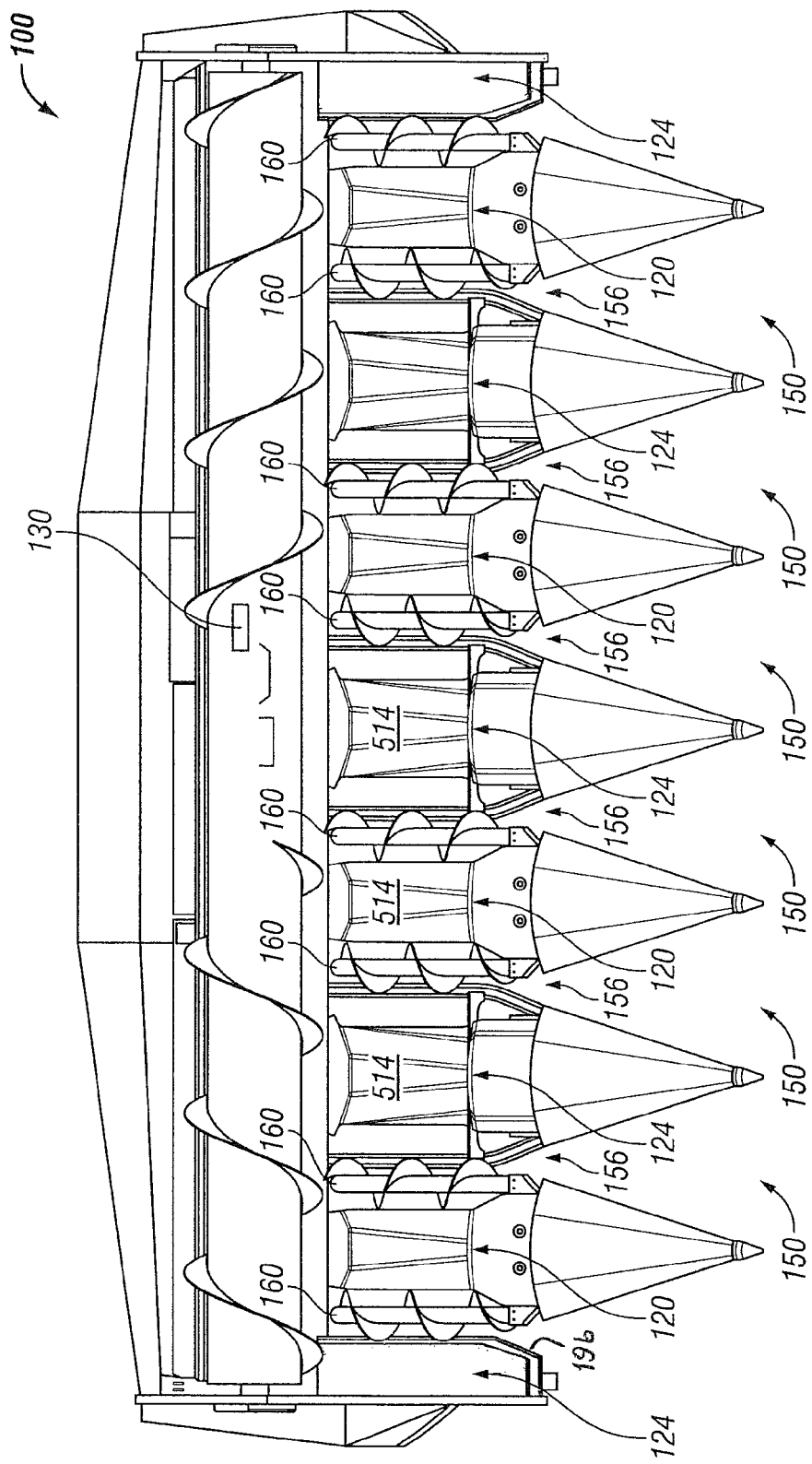
FIG. 2 shows a top view of the header of FIG. 1.
Figure 3:
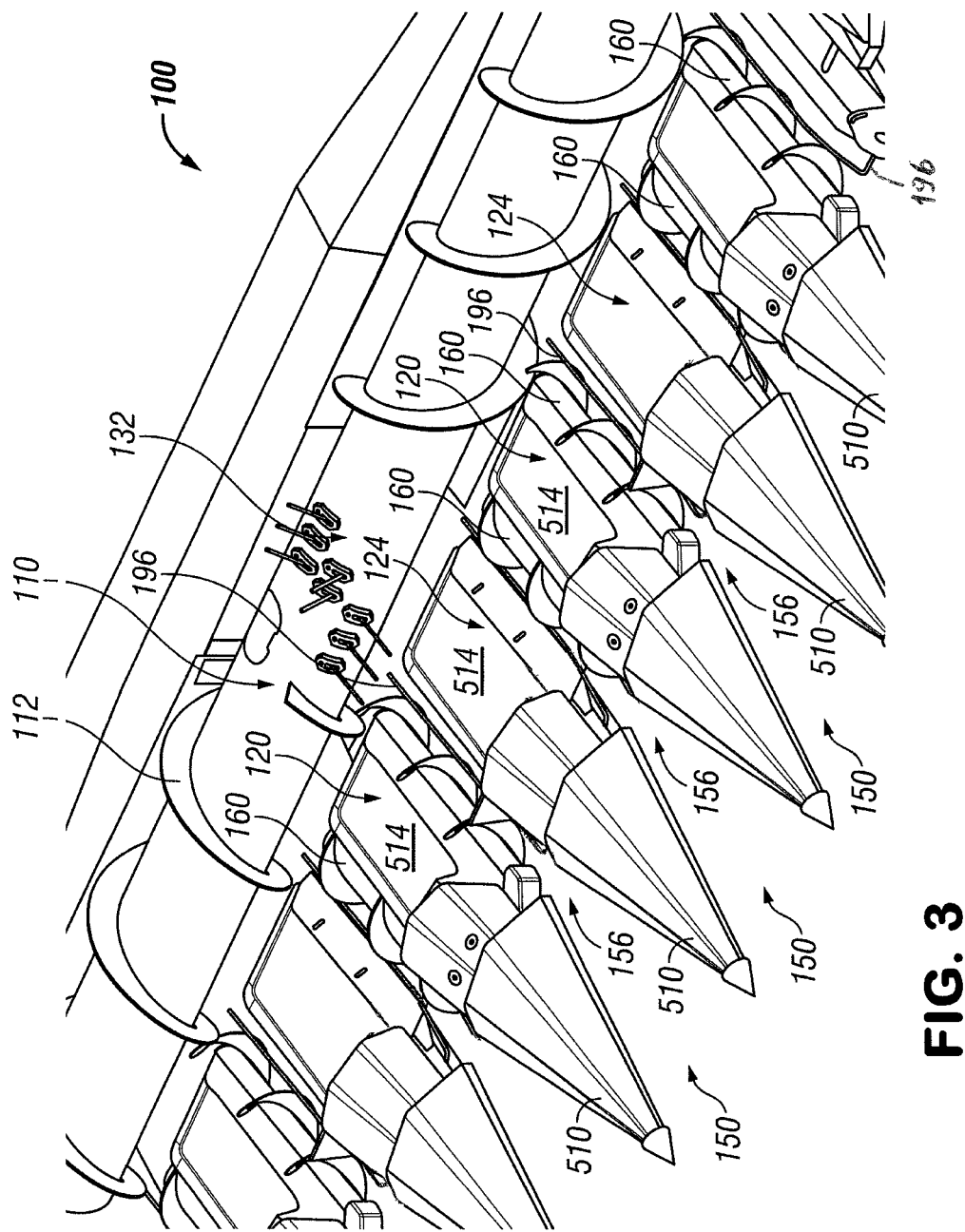
FIG. 3 shows a close-up view of a portion of the header of FIG. 1.
Figure 4:
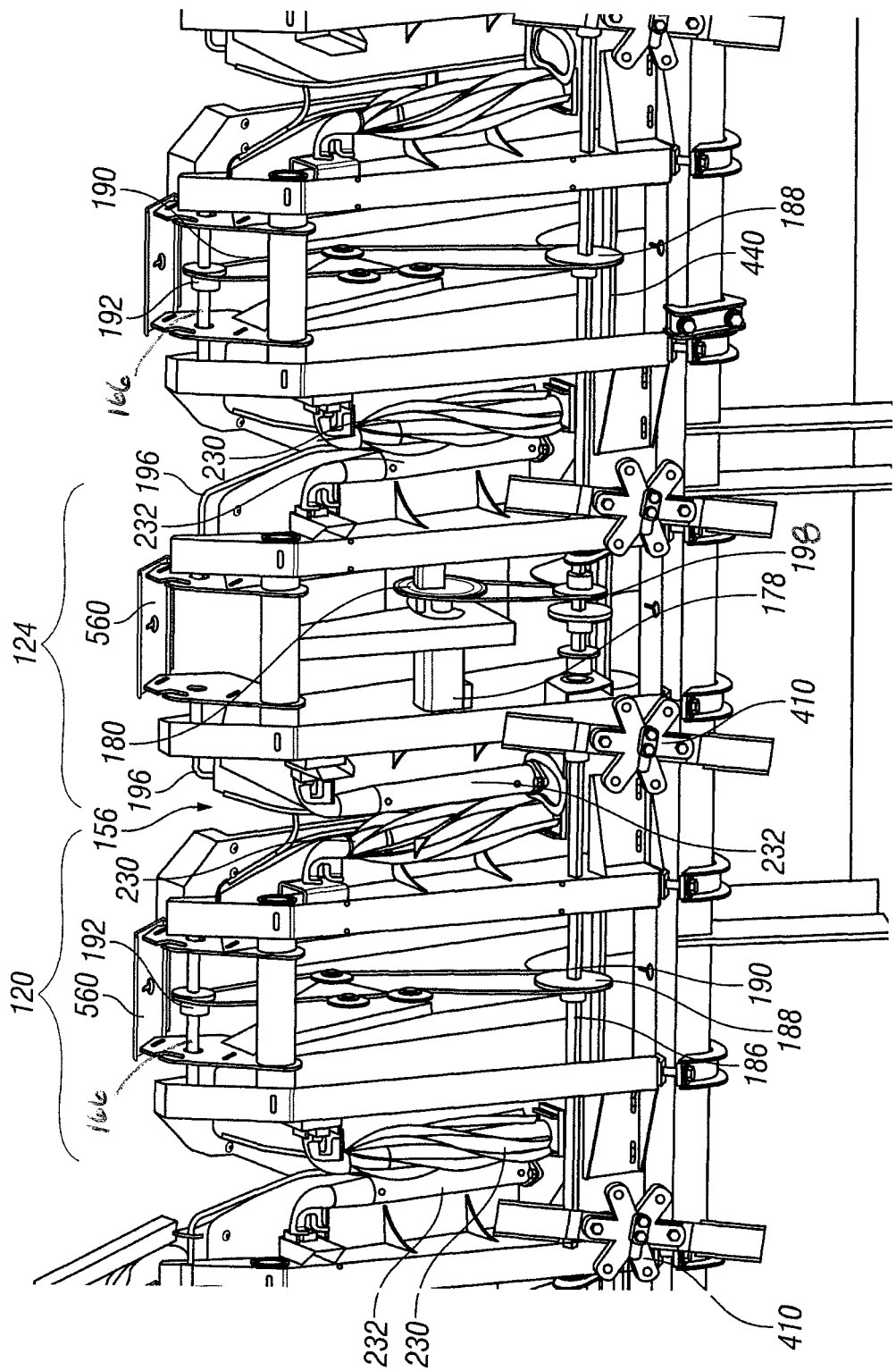
FIG. 4 shows a portion of the bottom of the header of FIG. 1.
Figure 5:
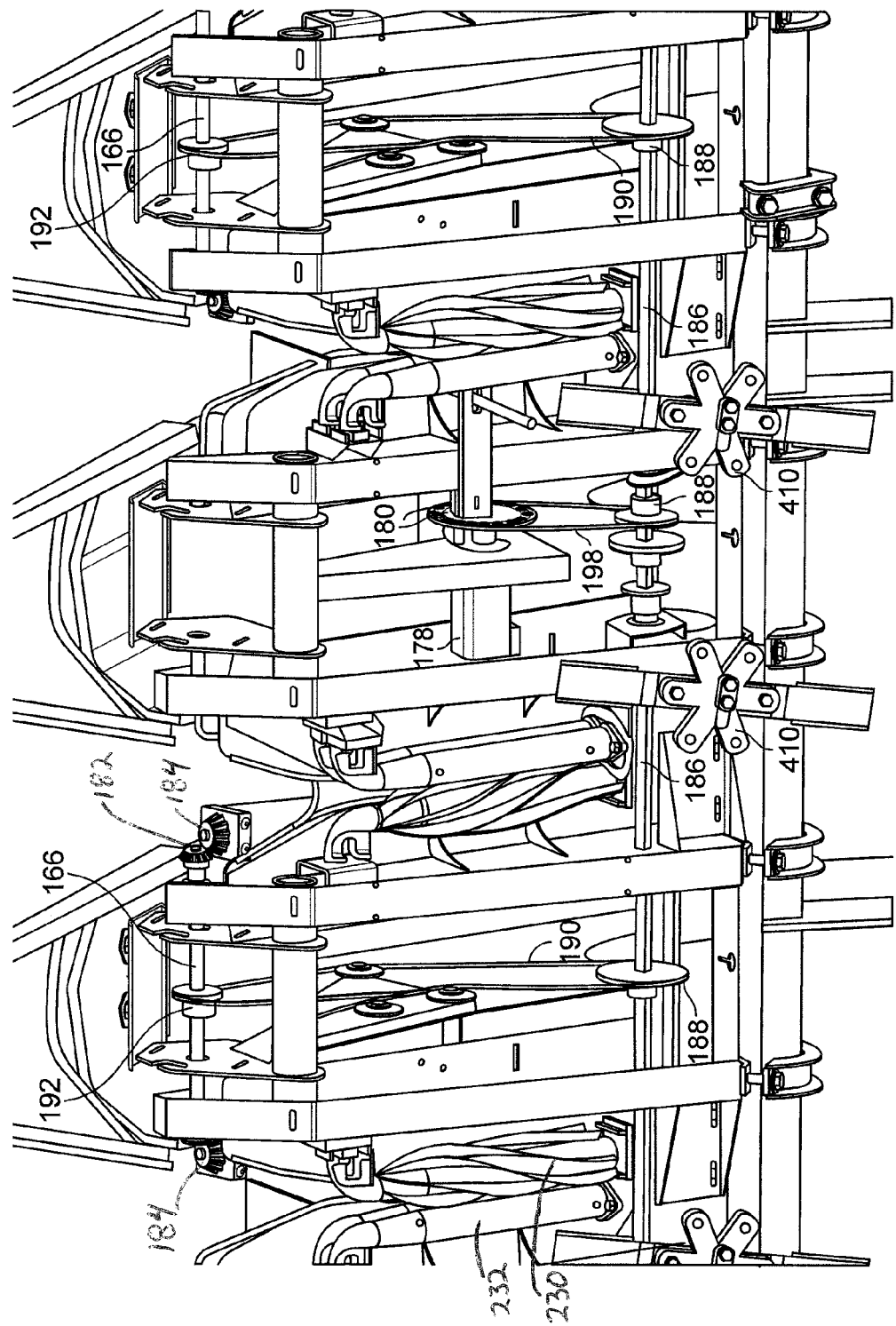
FIG. 5 shows a close-up view of a portion of the bottom of the header of FIG. 1.

Live row units 120 and dead row units 124 cooperate with one another. Live row units 120 have powered components, as described in greater detail below, whereas the dead row units 124 generally do not have powered components. In one embodiment, as best shown in FIGS. 1 and 2, the header 110 has four live row units 120, three dead row units 124, plus one half of a dead row unit 124 on each end of the header 110. The row units 120, 124 are arranged relative to one another so that the row units 120, 124 alternate relative to each other along the length of the header 110. In other words, every other row unit is a live row unit 120 with a dead row unit 124 adjacent to each live row unit 120. The row units 120, 124 are spaced relative to one another to correspond with the spacing of the crop to be harvested and to provide a path to receive the crop therebetween. For example, a live row unit 120 may be placed between two dead row units 124 to cooperate therewith.

Figure 6:
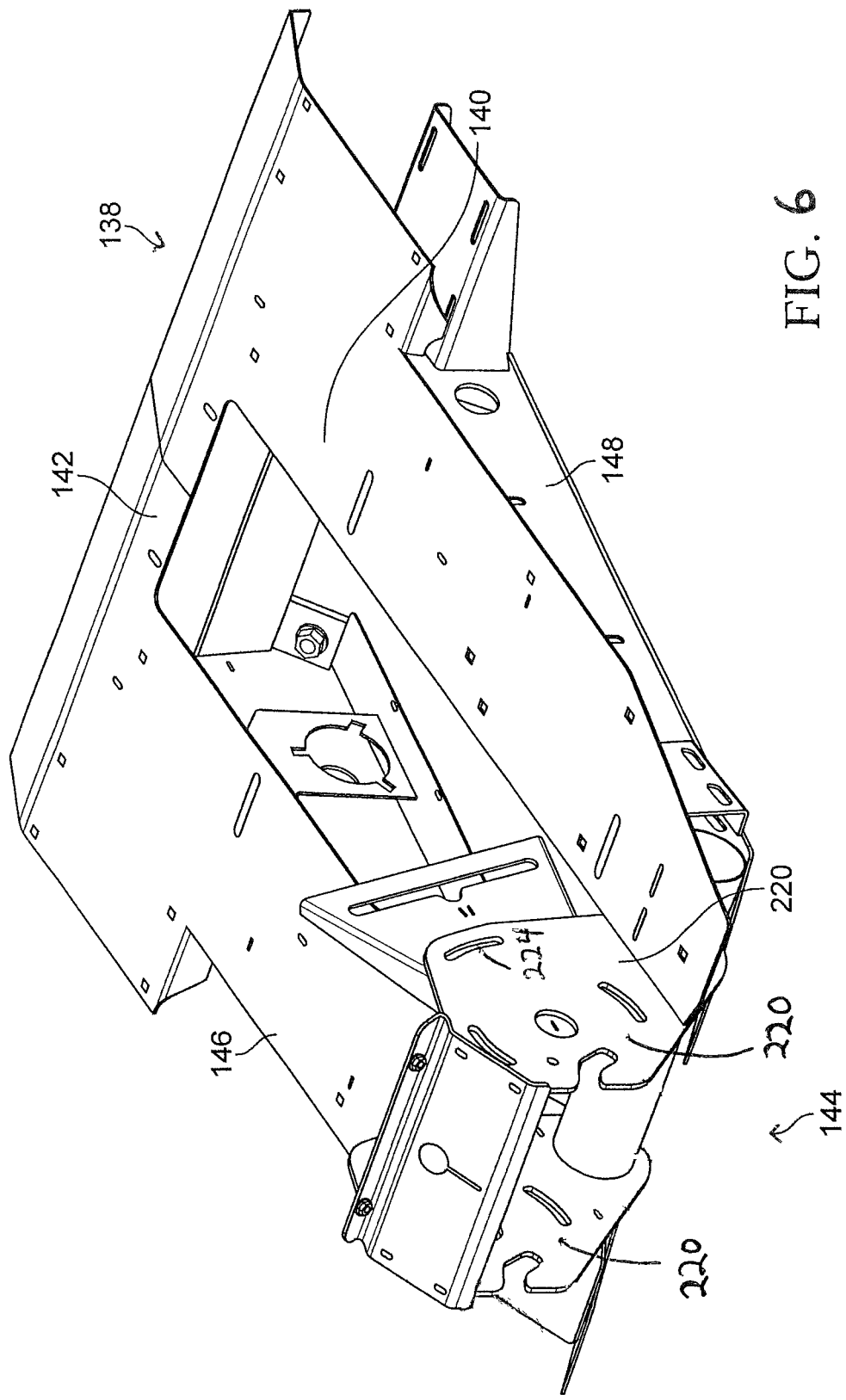
FIG. 6 shows a perspective view of a frame which forms part of a live row unit and part of an adjacent dead row unit.
Figure 7:
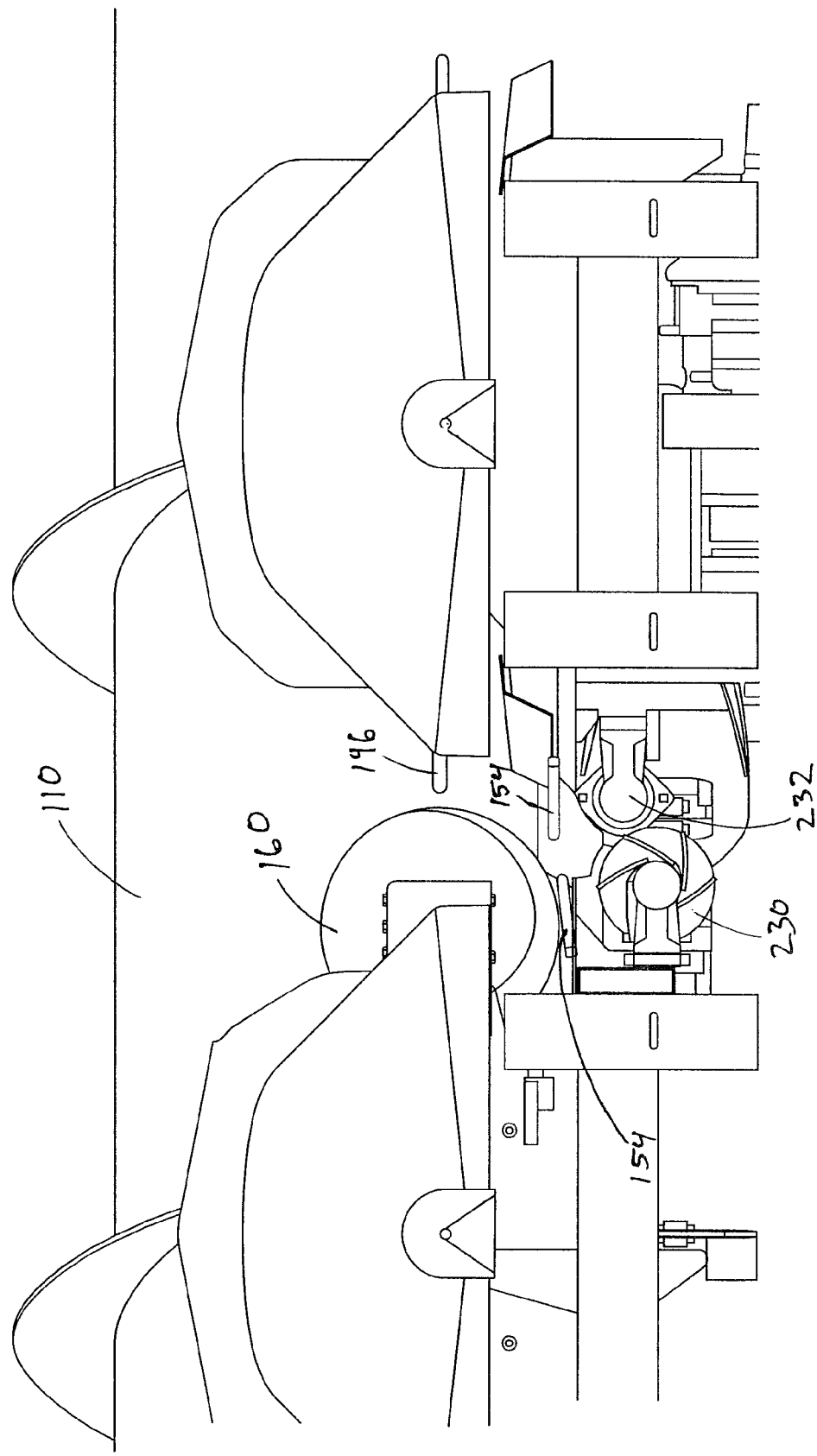
FIG. 7 shows a close-up view of the header from the front with the gather auger in a horizontal position, offset and opposing stripper plates, and an idler roll offset from an opposing powered snap roll.
Figure 8:
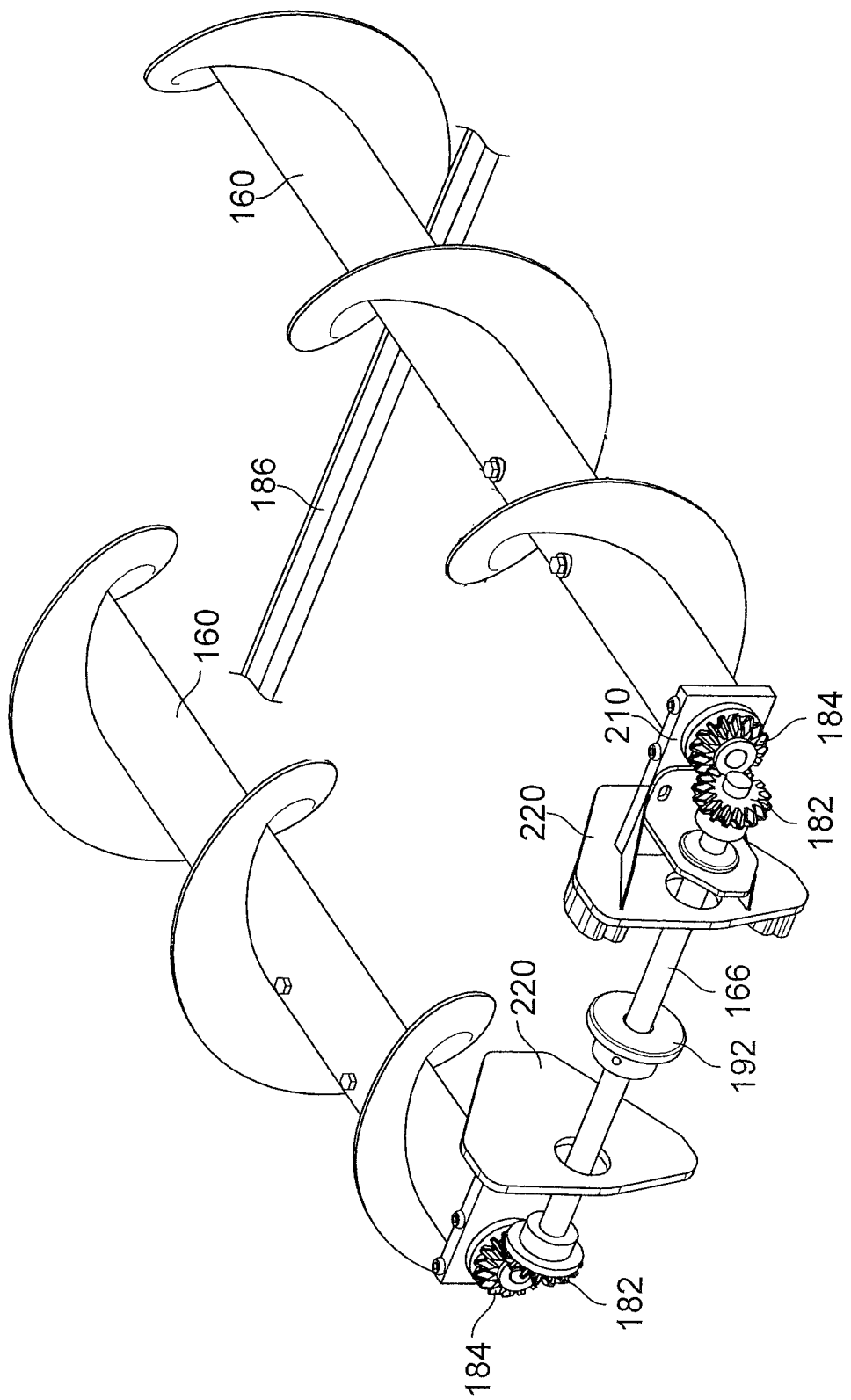
FIG. 8 shows a perspective view of a pair of gathering augers and means for driving the augers and allowing them to pivot.

FIG. 6 illustrates a row assembly 138 having a frame 140, a back end 142 and a forward end 144. Half of the frame 140 forms part of a live row unit 120 and the other half forms part of a dead row unit 124. Therefore, one live row unit 120 includes two halves of two separate and adjacent frames 140. One dead row unit 124 includes two halves of two separate and adjacent frames. Each frame 140 includes a first portion 146 and a second portion 148 which are spaced from one another and protrude outwardly and forward from the back end 142. At the front and between adjacent row units 120, 124 is a crop entry 150 for receiving the stalks of the crop. The first and second portions 146,148 receive stripper plates 152 which cooperate with one another to define the crop passage 156 between adjacent row units 120, 124. The stripper plates 152 strip useable parts such as ears of corn from crop stalks that are received in the crop passage 156.

Each live row unit 120 of the present invention includes at least one fore-to-aft gathering auger 160, in place of the two gathering chains and tensioners, for conveying the useable parts rearward to the cross auger 110. Each gathering auger 160 has a proximal end and a distal end and is preferably aligned substantially with a corresponding crop passage 156. However, the axis of rotation of the gathering auger 160 may instead be misaligned with the crop passage 156 such that the crop stalks in the back of the crop passage may be urged more so toward the gathering auger 160 than the crop stalks are at the beginning of the crop passage 156.

Each live row unit 120 of the present invention includes at least one fore-to-aft gathering auger 160, in place of the two gathering chains and tensioners, for conveying the useable parts rearward to the cross auger 110. Each gathering auger 160 has a proximal end and a distal end and is preferably aligned substantially with a corresponding crop passage 156. However, the axis of rotation of the gathering auger 160 may instead be misaligned with the crop passage 156 such that the crop stalks in the back of the crop passage may be urged more so toward the gathering auger 160 than the crop stalks that are at the beginning of the crop passage 156.

The gathering augers 160 are preferably driven independently of the snap rolls. The gathering auger 160 may be driven by electrical, mechanical or hydraulic means. Preferably, each gathering auger 160 is cantilevered from the frames 140 and rotationally driven from the forward most end of its respective row unit 120 away from the cross auger 110 rather than the rear of the row unit 120 in close proximity to the cross auger 110 so that the delivery or the distal end of the gathering auger 160 is not obstructed. This allows ears and stalks to be delivered to the cross auger 110 unimpeded by bearing supports, drive mechanisms or some other crop impeding structure.

In one or more embodiments of the present invention, the proximal end 162 of one or more gathering augers 160 is coupled to the frame 140 of the row unit 120 in a manner that permits the distal end 164 of the gathering auger 160 to move into and out of the feeder plane. In one embodiment, a mechanism coupled to the proximal end 162 of the gathering auger 160 allows the gathering auger 160 to rotate or pivot in a vertical plane between a first position for processing crops when harvesting and a second position for maintenance purposes. Preferably, the distal end 164 of the gathering auger when in the first position is higher in the vertical plane than when the distal end 164 is in the second position.

Also, the gathering auger 160 preferably pivots partially about a substantially horizontal rotational axis that extends substantially transversely between the row units 120. The gathering auger 160 may be pivoted such that its distal end 164 is raised upward above the row unit 120 to allow the gathering auger 160 to be repaired, replaced or perform maintenance without interference from the cross auger 110. Also, when the gathering auger 160 is pivoted upward out of the feeder plane other components can be more easily accessed.

An arrangement of gears or wheels such as bevel gears 182, 184 may be used for transmission of the driving motion to the gathering auger 160 from a driven shaft 166 within each live row unit 120 while also allowing the distal end of the gathering auger 160 to pivot upward about the same axis of the shaft 166. Each shaft 166 preferably drives a pair of gathering augers 160 of a single live row unit 120 so that the pair of gathering augers are driven about the same axis about which they may pivot into and out of the feeder plane. When the gathering auger 160 is pivoted upward, fasteners may be removed from the auger 160 so that the outer fighting portion of the gathering auger 160 may slide rearward so that it may be removed from an inner shaft and from cylindrical bearings allowing the flighting portion to rotate about the inner shaft.

Figure 9:
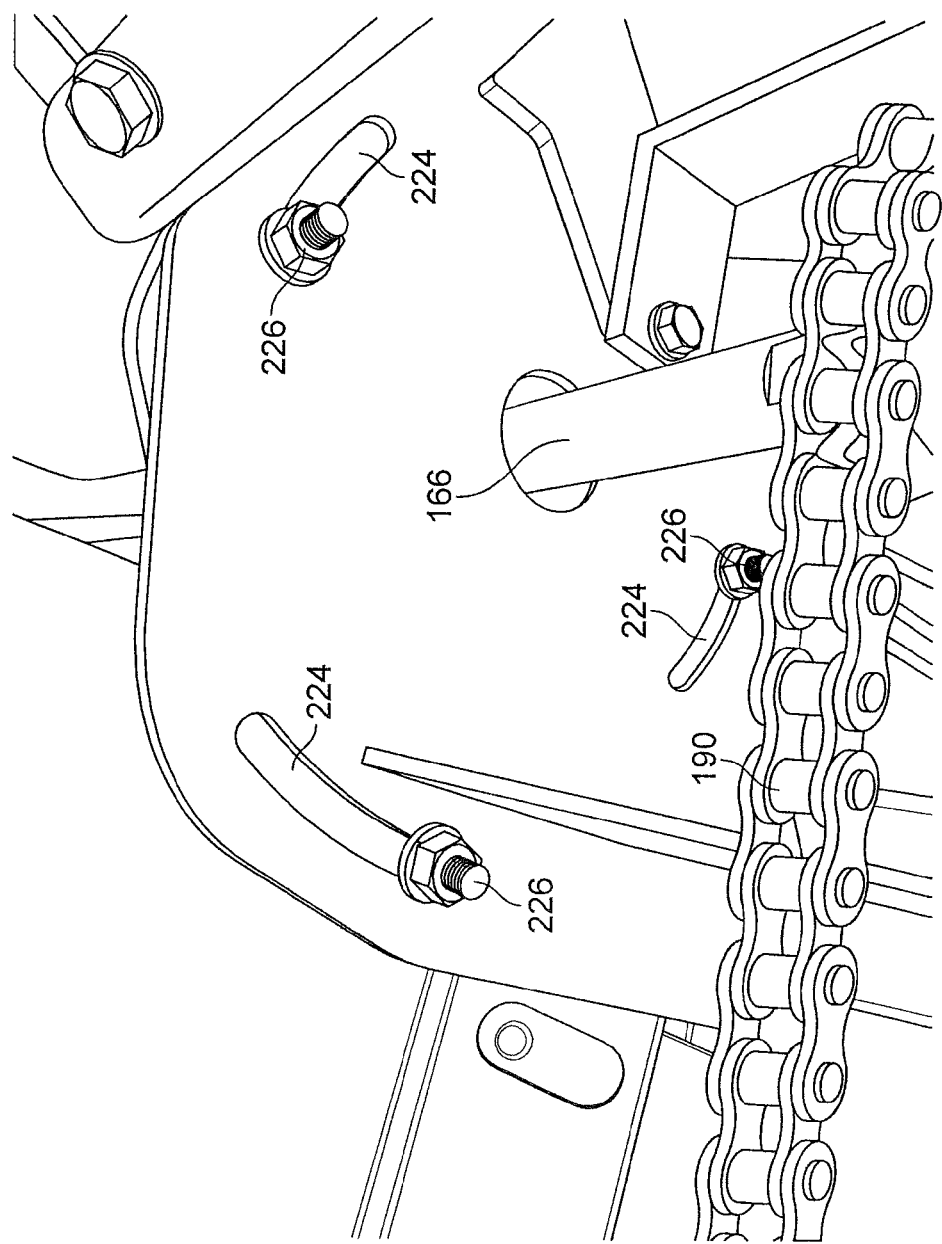
FIG. 9 shows a close-up view of the position of fasteners in slots in a frame of a row unit which allows the gathering auger to pivot.
Figure 10:
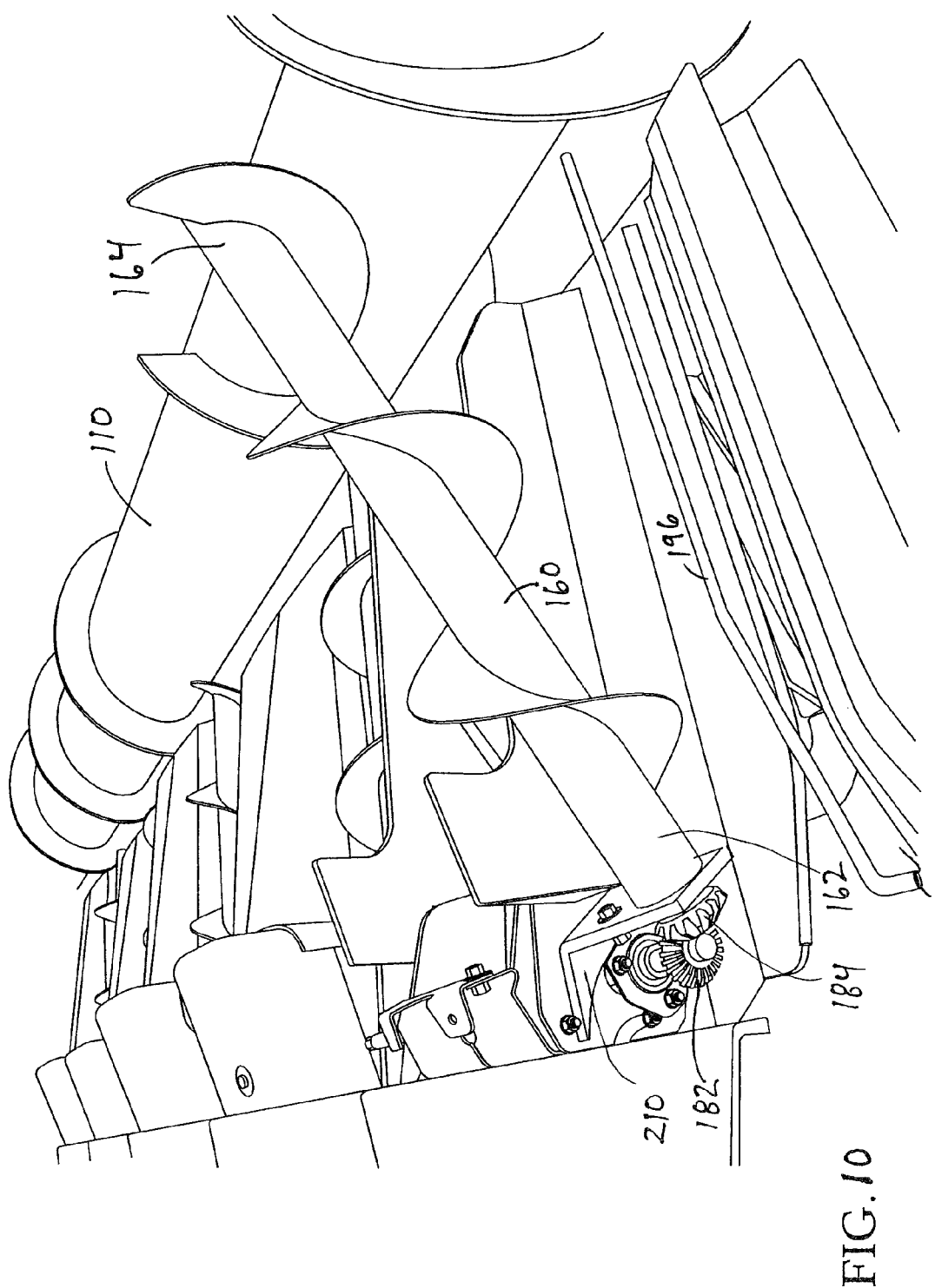
FIG. 10 shows a gathering auger pivoted upward.

A mounting bracket 210 rotationally couples the gathering auger 160 to an outer side of the frame 140 of the row assembly 138, such as vertical mounting support 220, to secure the gathering auger 160 to the frame 140 in an operational manner The vertical mounting support 220 includes radial extending openings or arched slots 224 for receiving fasteners 226 for securing the mounting bracket 210 to the frame 140. When the distal end 164 of the gathering auger 160 is pivoted upward, the distal end 164 of the gathering auger 160 coupled to the mounting bracket 210 causes the mounting bracket 210 to rotate in the slots 224 of the vertical mounting support 220. The length of the arched slots 224 dictate the range the gathering auger 160 can be pivoted between the first and second positions. FIGS. 1-3 and 7 illustrate the gathering auger 160 pivoted into the first position for processing crops. The fasteners 226 are moved all the way to one end of the slots 224 as shown in FIG. 9. On the other hand, FIGS. 10 and 11 illustrate the gathering auger 160 pivoted into the second position for maintenance where the fasteners 226 have moved to the opposite end of the slots 224. The range of motion of the distal end 162 of the gathering auger 160 may be limited by the length or shape of the slots 224.

The pair of straight bevel gears 182, 184, in mesh are used to drive the gathering auger 160 while harvesting. The shaft 166 of the live row unit 120 corresponds with the axis upon which one or more augers 160 pivot. The distal end of the gathering auger 160 is coupled to the bevel gear 182 which is driven by the bevel gear 184 on shaft 166. The shaft 166 may be chain driven by a hydraulic drive motor 178 with sprocket 180. Preferably, the drive motor 178 is sufficiently sized to drive all of the gathering augers 160. The drive motor 178 and sprocket 180 with chain 198 drives sprocket 188 and shaft 186 which extends in a transverse manner along the length of the header 100. There are preferably numerous other sprockets 188 along the length of the shaft 186. The number of sprockets 188 depends on the number of live row units 120. Chains 190 extend from the sprockets 188 of the shaft 186 to sprockets 192 on shaft 166.

Because the augers 160 are driven by the drive motor 178, the speed of the augers 160 is independent of the speed of the cross auger 110. The chain 190 drives the sprocket 192 which in turn drives the shaft 166 with bevel gears 182. The speed of the augers 160 can be changed automatically or manually in relation to the ground speed much like current grain headers on harvesters that control reel speed. Moreover, the augers 160 can be driven independent of the snap rolls. The speed of the gathering augers 160 may be varied while either or both the harvester and the snap rolls are maintained at a constant speed.

In addition to the apparatuses described herein, the inventions include a method for harvesting crop with an attachment for an agricultural vehicle that includes the gathering augers 160. The method includes operating the gathering augers 160 at a first speed to gather crop stalks in the crop passages 156 and operating a snap roll for removing useable parts from crop stalks at a second speed independently of the gathering augers 160. The method may also include one or more of the following steps: varying the speed of the gathering augers 160 while the speed of the snap rolls remain constant, increasing the speed of the gathering augers 160 while the speed of the snap rolls remain constant, decreasing the speed of the gathering augers 160 while the speed of the snap rolls remain constant, varying the speed of the snap rolls while the speed of the gathering augers 160 remain constant, increasing the speed of the snap rolls while the speed of the gathering augers 160 remain constant, decreasing the speed of the snap rolls while the speed of the gathering augers 160 remain constant, and/or changing the speed of the gathering augers 160 relative the ground speed of the harvester.

To keep stalks captured and engaged by the gathering auger 160 an elongated member 196 such as a rod is positioned in close proximity to the fighting of the gathering auger 160. Preferably, the elongated member 196 is substantially parallel aligned with the gathering auger 160. However, in other embodiments, at least a portion of the elongated member 196 may be shaped or curved along its length or the distal end of the elongated member 196 may be closer in proximity to the distal end of the gathering auger 160. The elongated member 196 may be rigid, flexible, or semi-flexible to urge the stalks in the crop passage toward the gathering auger 160. In one or more embodiments, the elongated member 196 is cantilevered off the forward end 144 of the frame 140 of the dead row unit 124 to urge the stalks in the crop passage 156 toward the gathering auger 160 of the opposing live row unit 120. The dead row unit may also include a second elongated member 196 extending toward another gathering auger 160 of another live row unit. In an alternative embodiment, the elongated member 196 may be a strap or be detachably coupled or mounted to a row unit.

The foregoing has broadly outlined some of the more pertinent aspects and features of the present invention. These should be construed to be merely illustrative of some of the more prominent features and applications of the invention.

Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. An implement for a harvester comprising a cross auger and a plurality of row units, said plurality of row units and said cross auger defining a feeder plane therebetween, said plurality of row units comprising;

a first row unit having a first gathering auger, said first gathering auger conveying useable parts from a crop stalk into the cross auger when in said feeder plane and at least a portion of said first gathering auger moveable out of said feeder plane for maintenance such that a distal end of said first gathering auger does not communicate with the cross auger, wherein said first row unit further comprises a first stripper plate below said first gathering auger at least partially defining a first crop passage and said first gathering auger cooperating with said first stripper plate to remove useable parts from crop stalks gathered in said first crop passage and to convey the stripped useable parts remaining above the stripper plate rearward into the cross auger, wherein said first gathering auger is supported and rotationally driven from its front in a cantilevered manner such that the useable parts are unobstructed into the cross auger, said first row unit further comprising a second gathering auger and a second stripper plate below said second gathering auger, said second stripper plate at least partially defining a second crop passage and said second auger cooperating with said second stripper plate to remove useable parts from crop stalks gathered in said second crop passage and to convey the stripped ears of corn rearward into the cross auger;

a second row unit, said second row unit having a third stripper plate opposing said first stripper plate of said first row unit to further define said first crop passage between said first and second row units, wherein said second row unit is otherwise free of gathering augers; and a third row unit, said third row unit having a forth stripper plate opposing said second stripper plate of said first row unit to further define said second crop passage between said first and third row units, wherein said third row unit is otherwise free of gathering augers.

2. The implement of claim 1 wherein said first gathering auger is pivotally coupled to said first row unit.

3. The implement of claim 1 wherein said first gathering auger is pivotally coupled from a forward end of said first gathering auger.

4. The implement of claim 1 further comprising a pivot mechanism coupled to a proximal end of said first gathering auger.

5. The implement of claim 4 wherein said pivot mechanism comprises a bevel gear.

6. The implement of claim 1 wherein said first gathering auger pivots into and out of said feeder plane.

7. The implement of claim 1 wherein said first gathering auger moves up and down in a vertical plane.

8. The implement of claim 1 wherein said first gathering auger pivots about a horizontal axis.

9. The implement of claim 1 wherein said first gathering auger is driven about the same axis about which it pivots.

10. The implement of claim 1 wherein said first gathering auger can pivot between a first position for harvesting and a second position for maintenance.

11. The implement of claim 10 wherein a distal end of said first gathering auger when in said second position is higher than said distal end of the first gathering auger when in said first position.

12. The first row unit of claim 1 wherein said first and second gathering augers rotate in opposite directions.

\* \* \* \* \*